US006843924B2

(12) United States Patent
Dreyer et al.

(10) Patent No.: US 6,843,924 B2
(45) Date of Patent: Jan. 18, 2005

(54) CONTAINMENT/EXCLUSION BARRIER SYSTEM WITH INFUSER ADAPTATION TO WATER INTAKE SYSTEM

(75) Inventors: Harold B. Dreyer, Anchorage, AK (US); Todd Nottingham, Seattle, WA (US)

(73) Assignee: Gunderboom, Inc., Anchorage, AK (US)

( * ) Notice: Subject to any disclaimer, the term of this patent is extended or adjusted under 35 U.S.C. 154(b) by 0 days.

(21) Appl. No.: 10/730,626

(22) Filed: Dec. 8, 2003

(65) Prior Publication Data

US 2004/0112839 A1 Jun. 17, 2004

Related U.S. Application Data

(63) Continuation of application No. 10/290,430, filed on Nov. 7, 2002, now Pat. No. 6,660,170.
(60) Provisional application No. 60/344,539, filed on Nov. 7, 2001.

(51) Int. Cl.$^7$ .................................................. E03B 1/00
(52) U.S. Cl. ...................... 210/747; 210/121; 210/170; 210/242.1; 210/416.1; 405/65; 405/127
(58) Field of Search .............................. 210/747, 767, 210/121, 122, 170, 242.1, 416.1, 416.3; 405/52, 63, 65, 127

(56) References Cited

U.S. PATENT DOCUMENTS

| | | |
|---|---|---|
| 629,578 A | 7/1899 | Maginn |
| 861,028 A | 7/1907 | Grote |
| 3,659,713 A | 5/1972 | Mueller |
| 3,713,540 A | 1/1973 | Davidson et al. |
| 3,744,254 A | 7/1973 | Fennelly |
| 3,979,289 A | 9/1976 | Bykowski et al. |
| 3,996,138 A | 12/1976 | Daidola et al. |
| 4,178,245 A | 12/1979 | Nakaoka et al. |
| 4,201,495 A | 5/1980 | Preus |
| 4,219,423 A | 8/1980 | Smith, Jr. |
| 4,288,321 A | 9/1981 | Beane |
| 4,296,884 A | 10/1981 | Luebke |
| 4,335,977 A | 6/1982 | Ihli |
| 4,419,232 A | 12/1983 | Arntyr et al. |
| 4,582,048 A | 4/1986 | Sorensen |
| 4,664,772 A | 5/1987 | Fors et al. |
| 4,669,972 A | 6/1987 | Koblanski |
| 4,692,059 A | 9/1987 | Juutilainen |
| 4,738,563 A | 4/1988 | Clark |
| 4,749,479 A | 6/1988 | Gray |
| 4,880,333 A | 11/1989 | Glasser et al. |

(List continued on next page.)

FOREIGN PATENT DOCUMENTS

| | | |
|---|---|---|
| FR | 2195-238 | 8/1972 |
| FR | 2284-709 | 9/1974 |
| FR | 2329-808 | 11/1975 |
| FR | 2579-239 A | 3/1985 |
| GB | 2 246 981 A | 2/1992 |
| WO | WO 91/07546 | 5/1991 |
| WO | WO 99/19570 | 4/1999 |

*Primary Examiner*—Christopher Upton
(74) *Attorney, Agent, or Firm*—Nixon Peabody LLP

(57) ABSTRACT

A water filtering system includes: a water intake system including a plurality of inlets in fluid communication with a water intake pump; and a containment/exclusion boom including (i) a support system positioned in a body of water, (ii) a curtain including a sheet of flexible fabric material that allows movement of water therethrough, the curtain having upper and lower ends with the upper end being connected to the support system, and (iii) means for maintaining the lower end of the curtain substantially against the floor of a body of water; wherein the curtain surrounds substantially all of the plurality of inlets and wherein, upon operation of the water intake pump, water is drawn through the curtain at which time the water is filtered, and subsequently filtered water is drawn through the plurality of inlets for delivery into the water intake system.

28 Claims, 5 Drawing Sheets

U.S. PATENT DOCUMENTS

| | | |
|---|---|---|
| 4,919,820 A | 4/1990 | Lafay et al. |
| 5,102,261 A | 4/1992 | Gunderson, III |
| 5,197,821 A | 3/1993 | Cain et al. |
| 5,220,958 A | 6/1993 | Bernhardt |
| 5,225,622 A | 7/1993 | Gettle et al. |
| 5,322,629 A | 6/1994 | Stewart |
| 5,345,741 A | 9/1994 | Slater et al. |
| 5,354,456 A | 10/1994 | Montgomery et al. |
| 5,354,459 A | 10/1994 | Smith |
| 5,372,711 A | 12/1994 | Sill |
| 5,394,786 A | 3/1995 | Gettle et al. |
| 5,427,679 A | 6/1995 | Daniels |
| 5,552,922 A | 9/1996 | Bergeron et al. |
| 5,558,462 A | 9/1996 | O'Haver |
| 5,893,978 A | 4/1999 | Yoda et al. |
| RE36,297 E | 9/1999 | Heino et al. |
| 5,992,104 A | 11/1999 | Hudak |
| 6,346,193 B1 | 2/2002 | Bauer |
| 2002/0080681 A1 | 6/2002 | Dreyer et al. |
| 2002/0185449 A1 | 12/2002 | Turner et al. |
| 2003/0010727 A1 * | 1/2003 | Gunderson III ............ 210/170 |

* cited by examiner

US 6,843,924 B2

CONTAINMENT/EXCLUSION BARRIER SYSTEM WITH INFUSER ADAPTATION TO WATER INTAKE SYSTEM

This application is a continuation of U.S. patent application Ser. No. 10/290,430, filed Nov. 7, 2002 now U.S. Pat. No. 6,660,170, which claims the benefit of U.S. Provisional Patent Application Ser. No. 60/344,539 filed Nov. 7, 2001. Each of the priority documents is hereby incorporated by reference in its entirety.

FIELD OF THE INVENTION

The present invention relates to a method and apparatus for excluding suspended particulates and/or aquatic life from entrainment into a cooling system water intake site of a facility using industrial water.

BACKGROUND OF THE INVENTION

Industrial plants and power plants utilize water from nearby water sources for cooling purposes. Aquatic life (e.g., fish, fish eggs, larvae, zebra mussels, vegetation, etc.) in the surrounding water body is often negatively impacted by entrainment within the cooling system water intakes. Cooling systems are also negatively impacted by the entrainment of sediments and debris from the surrounding water body. Entrained contaminants within the cooling systems can result in system failures due to damaged components and costly shut-downs for frequent maintenance and/or repairs.

Floating barrier or containment/exclusion boom systems have been installed at these water intakes to deal with these problems. These boom systems are optimal for some situations, but the size of the system can be a problem when the boom system encroaches upon navigable waters. For example, in circumstances when a large volume of water is drawn through the containment/exclusion boom system and into a water intake system, the traditional containment/exclusion boom system can encroach upon the water intake structure. It is often necessary, therefore, to move the containment/exclusion boom system further away from the water intake structure, thereby encroaching upon navigable waters and creating hazards to navigation. Thus, it would be desirable to produce an alternative filtration system which avoids this problem.

The present invention is directed toward overcoming these deficiencies.

SUMMARY OF THE INVENTION

A first aspect of the present invention relates to a filtering system for filtering intake water of a water intake system. The filtering system includes: a water intake system comprising a plurality of inlets in fluid communication with a water intake pump; and a containment/exclusion boom including (i) a support system positioned in a body of water, (ii) a curtain comprising a sheet of flexible fabric material that allows movement of water therethrough, the curtain having upper and lower ends with the upper end being connected to the support system, and (iii) means for maintaining the lower end of the curtain substantially against the floor of a body of water; wherein the curtain surrounds substantially all of the plurality of inlets and wherein, upon operation of the water intake pump, water is drawn through the curtain at which time the water is filtered, and subsequently filtered water is drawn through the plurality of inlets for delivery into the water intake system.

A second aspect of the present invention relates to one preferred embodiment of the present invention, which is a combination boat dock and water filtering system. The combined structure includes a water filtering system of the present invention, with the support structure being in the form of a boat dock.

A third aspect of the present invention relates to a method of filtering water entering a water intake system. The method includes: providing a water delivery system including a plurality of inlets in a body of water that are in fluid communication with a water intake pump; installing a containment/exclusion boom into the body of water in a manner surrounding substantially all of the plurality of inlets, the containment/exclusion including (i) a support system adjacent the plurality of inlets, (ii) a curtain including a sheet of flexible fabric material that allows movement of water therethrough, the curtain having upper and lower ends with the upper end being connected to the support system, and (iii) means for maintaining the lower end of the curtain substantially against the floor of the body of water; and drawing water through the water intake system, whereby water entering the water intake system is drawn through the curtain, thereby filtering the water, prior to passing through the plurality of inlets for delivery into the water intake system.

The filtration systems of the present invention offer a number of advantages over full length containment/exclusion boom systems used in conjunction with conventional water intake systems. In particular, due to the installation of a plurality of primary water intake conduits (which thereby diffuse the amount of water entering any single intake site), a boom curtain can be installed closer to the primary intake conduits. As a result, the boom curtain can be located closer to the shoreline and further from navigable waters. This is of significant importance in various industries that employ water-cooling systems, who will be able to utilize the filtration system of the present invention to comply with governmental regulations (regarding exclusion of aquatic biota) rather than installing expensive dry cooling towers. Moreover, the support structure used to support the boom curtain can be constructed for multiple uses, including the installation of docking slips for use as municipal or private marinas.

DETAILED DESCRIPTION OF THE INVENTION

Figure 1:
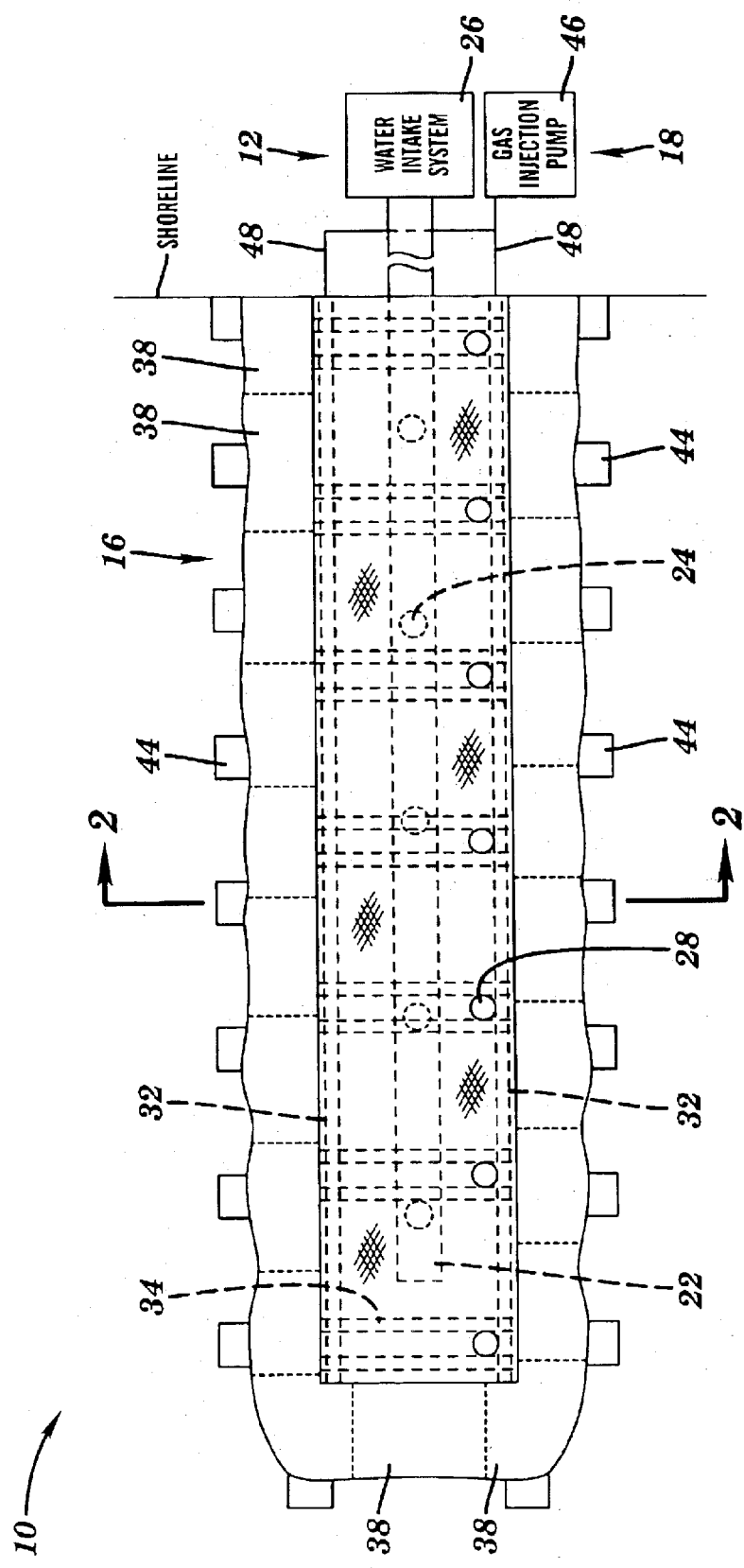
FIG. 1 is a plan view of a barrier system to an infuser adapter of a water intake system in accordance with one embodiment of the present invention.

The present invention relates to a system designed for filtration of water taken up by a water intake system.

The system of the present invention is specifically intended to adapt existing water intake systems or otherwise be used on new water intake structures. In particular, an existing water intake system is adapted by installing a water delivery system comprising a plurality of inlets in fluid communication with a water intake pump of an existing water intake system. More specifically, the water delivery system includes a main collector pipe attached to the existing water intake structure by welding or any other appropriate method of attachment. The main collector pipe, after attachment to the existing water intake, may be placed anywhere throughout the full water column or buried beneath the floor. Existing structures of the cooling system water intake typically will dictate its placement. The length of the main collector pipe is dictated by individual project design, i.e., shoreline contours, bottom contours, etc.

In addition, primary water intake pipes are located along the main collector pipe at intervals indicated by the specific project design. The primary intake pipes define the inlet into the modified water intake system. The diameter of pipe used for both the main collector pipe and the primary intake pipes is dictated by specific project design (i.e., volume of water required) and are welded or otherwise secured in place. All pipe used is steel or any other appropriate material, such as concrete. The primary intake pipes may extend from the main collector pipe at any angle, horizontally, vertically, or any angle in between.

The support system is preferably a permanent or semi-permanent support system, more preferably a floating type system. The support system typically includes a plurality of vertical pilings in one or more rows and horizontal supports connected to the vertical pilings to accommodate its floating nature (i.e., rise and fall of the horizontal supports). The horizontal support systems can include weight-bearing surfaces, non-weight surfaces, and combinations thereof. By non-weight bearing surface, it is intended that the surface is a covering material that cannot support the weight of an average person. Suitable covering materials include, without limitation, both permeable materials, such as the geotextile materials described below, and non-permeable materials, such as tank liners formed of polyvinyl or other similar materials.

In accordance with particularly preferred floating support systems, the support system also doubles as a dock with a plurality of slips or otherwise with a plurality of locations where boats can be secured.

Alternatively, a buoyant system can also be utilized that does not include vertical or horizontal support members. Instead, a floating support system can be used that includes a plurality of conventional flotation units such as inflatable devices, air bags, and floats made from buoyant materials, such as cork, synthetic foams, and other plastics. However, conventional devices may not perform adequately under adverse conditions. It has been found that under adverse conditions, expanded polystyrene ("EPS") is especially suitable for use as the flotation unit. It is desirable to coat or seal the EPS to prevent deterioration associated with prolonged exposure to the elements. EPS is commercially available from ARCO Chemical Company as DYLITE® and can be formed or molded into flotation units of various sizes and shapes (e.g., cylindrical, square, etc.) as required by project design. The EPS has a positive buoyancy that keeps the flotation unit substantially above the water surface at all times, allowing the flotation unit to ride the waves, even in adverse conditions. An EPS flotation unit is not deformed by wave action and does not lose buoyancy if punctured, as would an inflatable device. A single cubic foot of EPS can support as much as 60 lbs. A commonly used size of flotation unit of EPS is an 8" to 12" diameter cylindrical configuration, but the size can be readily adapted to meet specific wave and environmental conditions and depth requirements.

The flexible fabric material is preferably formed of a geosynthetic fabric, such as a geotextile material. Geosynthetic fabric is "hydrophobic" and "water-pervious," meaning that water passes through the fabric. The hydrophobic property of geosynthetic fabric permits the passage of water current therethrough without the fibers absorbing water and swelling, which would reduce the permitivity.

Geosynthetic fabrics are commercially available in a range of tensile strengths, permeabilities, and permitivities, and are useful for the purposes of the invention throughout those ranges.

Depending upon the environmental, tidal, wave and current conditions, anticipated load requirements, and other parameters, the appropriate geosynthetic fabric can be selected to meet the specific design requirements for a given containment/exclusion project design.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AMOPAVE® HD 4597, 4545, 4553, and 4561 (all polypropylene fabrics commercially available from Amoco Fabrics and Fibers Company); Typar®, a polypropylene fabric commercially available from Dupont; TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company). The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

It is preferred that the flexible fabric material is multi-layered, with the multiple layers being formed of the same geosynthetic material or different geosynthetic materials. Thus, a woven geosynthetic material can be used in combination with a non-woven geosynthetic material, two different woven geosynthetic materials can be used, or two different non-woven geosynthetic materials can be used. The multi-layered flexible fabric material can also be segmented into individual panels (i.e., at least two such panels) by stitching, heat sealing, or otherwise physically connecting the two sheets together. The physical structure of the materials can also be modified to affect flow rates therethrough, as taught in U.S. patent application Ser. No. 09/168,491 to Gunderson et al., filed Oct. 8, 1998, which is hereby incorporated by reference in its entirety.

When a two-layered (or multi-layered) flexible fabric material is employed, a gas injection system which includes a source of compressed gas in fluid communication with at least one outlet positioned between the two layers of flexible fabric material. A gas injection system of this type is disclosed in U.S. patent application Ser. No. 09/168,491 to Gunderson et al., filed Oct. 8, 1998, which is hereby incorporated by reference in its entirety. When the two-layered (or multi-layered) sheet of flexible material is segmented into individual panels, each panel may be equipped with its own outlet of the gas injection system. The gas injection system can be used to clean the filter panels of sediments and remove impinging aquatic organisms to maintain adequate water flow. The bubbling action of the expanding air rising up through the curtain panels shakes and cleans the filter fabric of any sediment and/or aquatic life which may be impinged thereon. (During cleaning, water filtration typically will not be occurring so that the injected air will be allowed to pass externally of the fabric material rather than exclusively in the direction of the arrows shown in FIGS. 2, 4, and 5.)

The flexible fabric material is preferably connected to the frame by bolting, clamps, fasteners, lacing or any other appropriate attachment method which allows its removal and replacement, if necessary. A plurality of such connections can be made.

The boom of the present invention can also include additional features or components which are known and disclosed, for example, in U.S. Pat. No. 5,102,261 to Gunderson, III, which is hereby incorporated by reference in its entirety. Exemplary of such additional features or components include: tow cords, which are used for towing floating booms into position in a body of water or simply from one location to another; and connector straps (preferably with industrial hook-and-loop fastening strips), which are used to connect two lengths of the boom together to form a single continuous structure having overlapping curtain structures.

The boom curtain can also be fabricated using pleated curtains, as described in U.S. patent application Ser. No. 10/283,384 to Dreyer, filed Oct. 29, 2002, which is hereby incorporated by reference in its entirety.

The boom curtain can also include a Y-panel anchoring system as disclosed in U.S. patent application Ser. No. 10/134,359 to Dreyer, filed Apr. 26, 2002, which is hereby incorporated by reference in its entirety.

Different portions of the boom curtain can be connected together using zipper connections, as disclosed in U.S. patent application Ser. No. 10/270,798 to Dreyer, filed Oct. 11, 2002, which is hereby incorporated by reference in its entirety.

The vertical dimension of the curtain can be increased by securing additional sheets of geosynthetic fabric together along their coextending edges until the desired height is obtained.

Sewing or heat fusion of the geosynthetic material can be used to form the sleeves, to connect multiple sheets together to add additional height, or to attach the tow cords, stirrups for attaching chains or anchors lines, etc. The geosynthetic fabric can be sewn with a conventional industrial sewing machine, and heat fusion can be accomplished with an industrial iron. Heat fusion can also be accomplished by puncturing or piercing through the overlapped geosynthetic fabric with a soldering iron. Good, strong connections have been made this way.

Ballasts such as lengths of steel chain (from less than ⅛ inch to over ¾ inch) and steel cable (from less than ¾ inch to over 1½ inches in diameter) have been used. Of course, chains and cables of greater or less diameter may be used to meet the specific requirements of a project design. Alternatively, anchors and cables can be used to maintain the bottom of the curtain against the bottom of the body of water. The ballast can be received within a portion of the boom curtain sections or otherwise connected to the lower edge thereof (e.g., tied with wire or other means).

Figure 2:
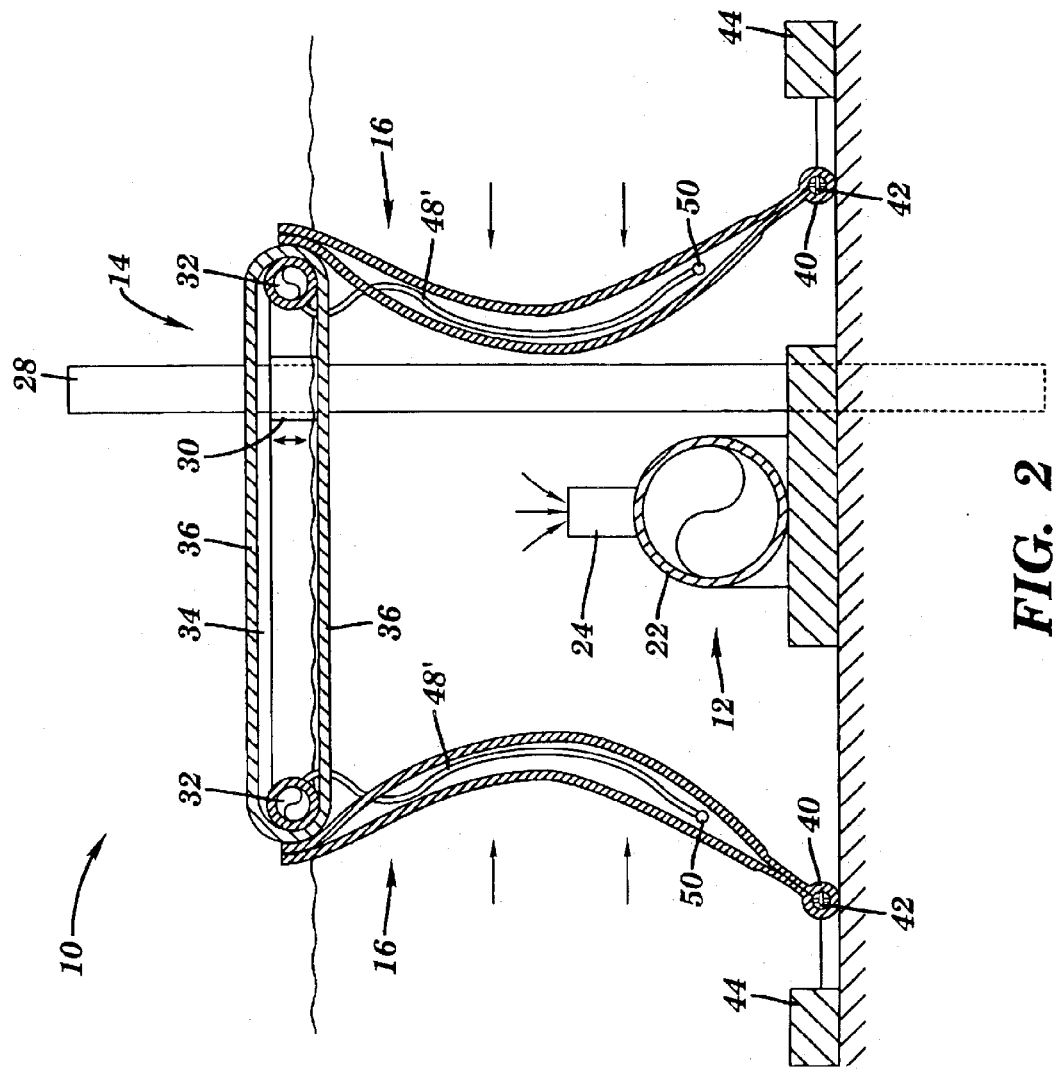
FIG. 2 is a cross sectional view along line 2—2 of FIG. 1.

Referring now to FIGS. 1 and 2, a filtration system 10 in accordance with one embodiment of the present invention is disclosed. The filtration system includes a water intake system 12 and a containment/exclusion boom that includes a support system 14, a boom curtain 16, and a gas injection system 18.

The water intake system 12 includes a main collector pipe 22 having a plurality of substantially equi-spaced primary intake pipes 24, and optional shut-off valves for each primary intake pipe, all of which are coupled to an existing water intake system 26 (that contains the pumps and conduits for delivering water throughout the industrial site).

The support system 14 of the containment/exclusion boom includes a plurality of vertical pilings 28 and a floating structure connected thereto, with the floating structure covering the area of the body of water that is contained by the curtain. (see FIG. 2).

The vertical pilings 28 are secured into the floor of the body of water using conventional techniques. As shown, the plurality of pilings are present in a single row. Each vertical piling includes a collar 30 which freely slides along the length of the vertical piling in the direction of the arrows shown in FIG. 2. Collar 30 is used to connect the floating structure to the vertical pilings 28.

The floating structure includes a pair of floating pipes 32 spaced apart from one another, a plurality of struts 34 spanning between the pair of floating pipes, and a covering material 36 that encloses the region between the pair of floating pipes. The floating structure can be formed from a number of discrete sections that are connected together or a single continuous floating structure can be utilized.

The floating pipes 32 are steel, aluminum or thermoplastic pipes that have been sealed. The floating pipes are of suitable diameter to provide the desired buoyancy. Alternatively, instead of using pipes, a buoyant material of the type described above, e.g., EPS, can be utilized.

The struts 34 are preferably formed of the same materials that can be used to form the floating pipes. The struts can be connected to the floating pipes by mechanical connection (e.g., sealed bolts, or straps or other lashing tied or secured with mating hook and loop fasteners) or otherwise welding the components together.

Secured over the entire floating structure is a non-walking cover 36 of the type describe above. The cover 36 can be attached to the struts and floating pipes by straps or lashing.

Connected to the floating structure is the containment/ exclusion boom curtain 16. The curtain 16 is formed of two sheets of geosynthetic material secured together by sewing, heat fusion, etc. and having a plurality of panels 38 formed along its length by having the two sheets connected together substantially from the lower end to the upper end of the curtain. The upper end of the curtain is secured to the geosynthetic material used to form the covering material, by a permanent connection (e.g., sewing, heat fusion, etc.) or temporary connection such as a zipper connection of the type described above. The lower end includes a sleeve 40 that has retained therein a length of ballast chain 42. The lower end also has anchors 44 secured along its length to further assist in maintaining the lower end of the curtain substantially against the floor of the body of water.

To allow for cleaning of the curtain 16, the system also includes the gas injection system 18. This system includes a source of compressed gas 46 such as a pump or compressor, a series of conduits 48, 48' that carry the compressed gas to the curtain, and a plurality of outlets 50 positioned between the sheets of geosynthetic material that form the curtain. Preferably, each panel 38 of the curtain includes one or more outlets. The conduits 48 can be integrated into the support system. Alternatively, the floating pipes 32 can be used to carry the conduits containing the compressed gas.

Figure 3:
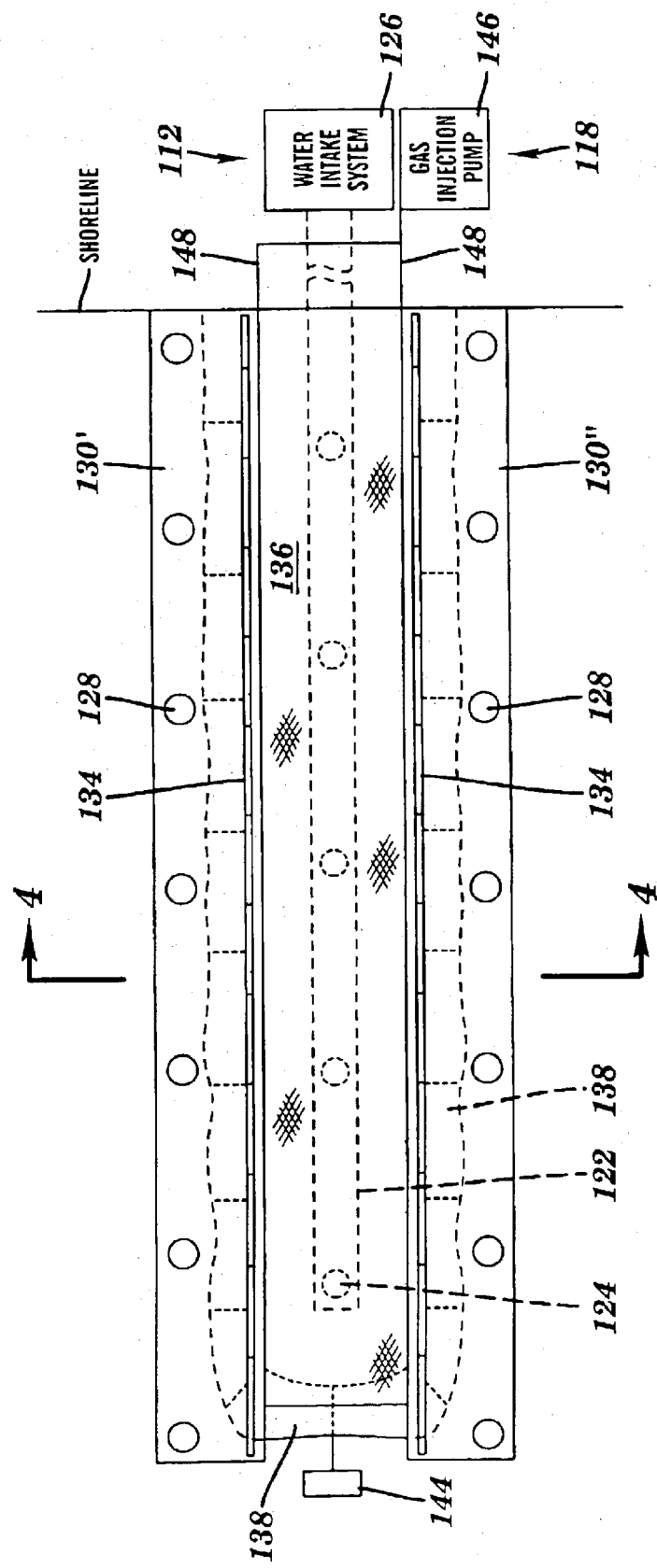
FIG. 3 is a plan view of a barrier system to an infuser adapter of a water intake system in accordance with another embodiment of the present invention.
Figure 4:
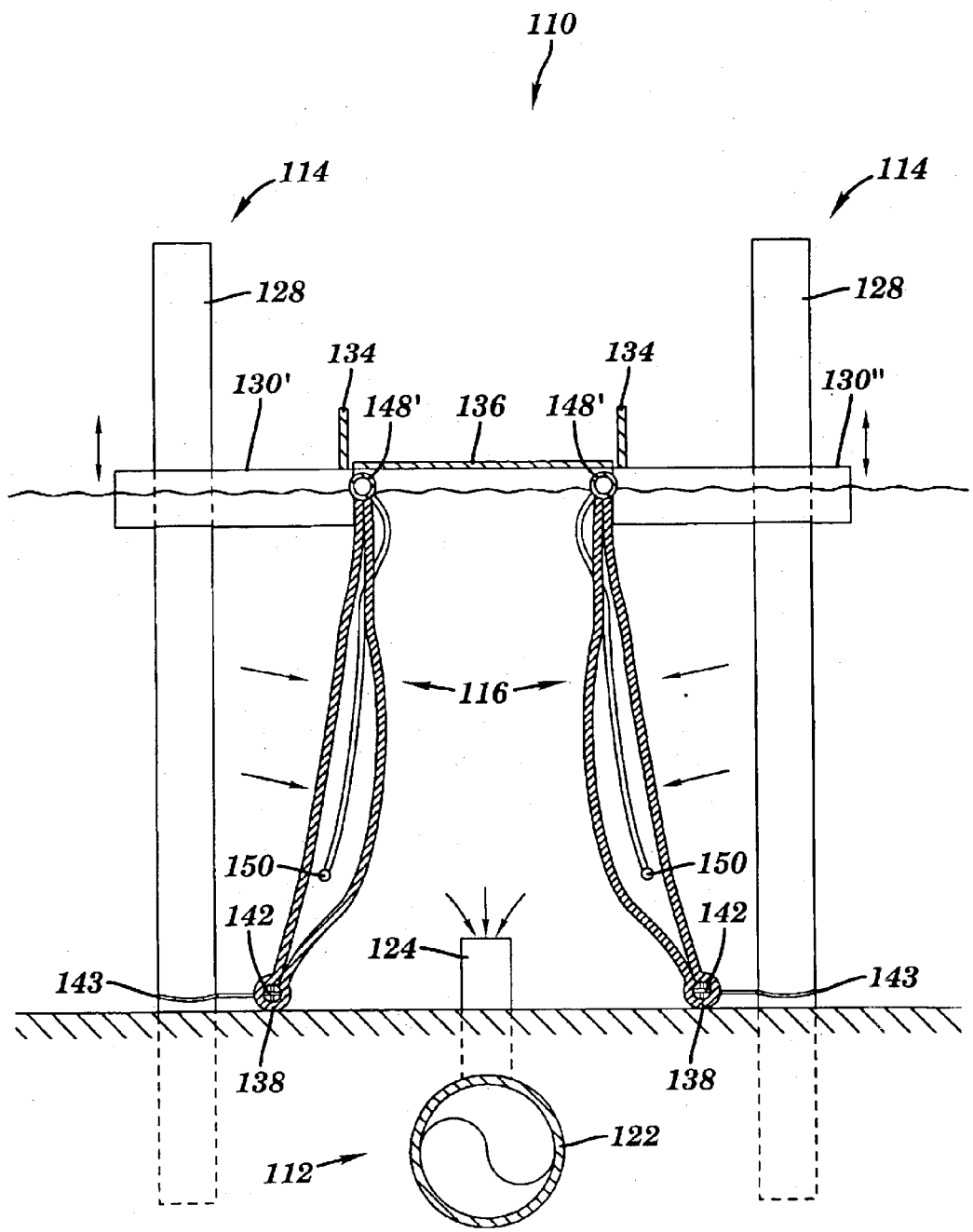
FIG. 4 is a cross sectional view along line 4—4 of FIG. 3.

Referring now to FIGS. 3 and 4, a filtration system 110 in accordance with a second embodiment of the present invention is disclosed. The filtration system includes a water intake system 112 and a containment/exclusion boom that includes a support system 114, a boom curtain 116, and a gas injection system 118.

The water intake system 112 is substantially the same as water intake system 12 described in connection with the previous embodiment, including a main collector pipe 122 having a plurality of substantially equi-spaced primary intake pipes 124 in communication with an existing water intake system 126.

The support system 114 of the containment/exclusion boom includes a plurality of vertical pilings 128 formed into two substantially parallel rows, and a floating structure connected thereto, with the floating structure covering the area of the body of water that is contained by the curtain. (see FIG. 4). The floating structure includes a first portion 130' connected to one row of pilings and a second portion 130" of the floating structure connected to the other row of pilings.

The first and second portions 130',130" independently float freely along the length of the pilings in the direction of the arrows shown in FIG. 4. Both the first and second portions 130',130" are floating concrete walkways that are known in the art, including foam-filled concrete walkways. These concrete walkways are, of course, weight-bearing surfaces. Installed between the first and second portions 130',130" is a non-weight bearing covering material 136 of the type described above. To protect against individuals from inadvertently stepping onto the covering material 136, rails 134 are provided along the length of the support structure.

Connected to the floating structure is the containment/exclusion boom curtain 116. The curtain 116 is formed of two sheets of geosynthetic material secured together by sewing, heat fusion, etc. and having a plurality of panels 138 formed along its length by having the two sheets connected together substantially from the lower end to the upper end of the curtain. The upper end of the curtain is secured to the first and second portions 130',130" by suspending the entire curtain from hooks using turnbuckles or the like. The lower end includes a sleeve 140 that has retained therein a length of ballast chain 142. The lower end is also secured by tie-lines 143 (e.g., steel cable) to the pilings 128 or anchors 144 to further assist in maintaining the lower end of the curtain substantially against the floor of the body of water.

To allow for cleaning of the curtain 116, the system also includes the gas injection system 118. This system includes a source of compressed gas 146 such as a pump or compressor, a series of conduits 148, 148' that carry the compressed gas to the curtain, and a plurality of outlets 150 positioned between the sheets of geosynthetic material that form the curtain. Preferably, each panel 138 of the curtain includes one or more outlets. The conduits 148, 148' can be integrated into the support system.

As shown in FIG. 4, the support structure is in the form of a boat dock, whereby boats are capable of docking on the sides of the floating first and second portions 130',130" which are nearest the pilings 128. Although not shown, it should be appreciated that any number of cleats can be provided for purposes of facilitating its use as a dock and bumpers can be provided for purposes of preventing damage to the floating first and second portions 130',130" by contact with boats. These components have purposefully not been included for the sake of clarity in viewing the drawings. This allows the filtration system to serve multiple functions which, in effect, camouflages its use as a water filtration system.

Figure 5:
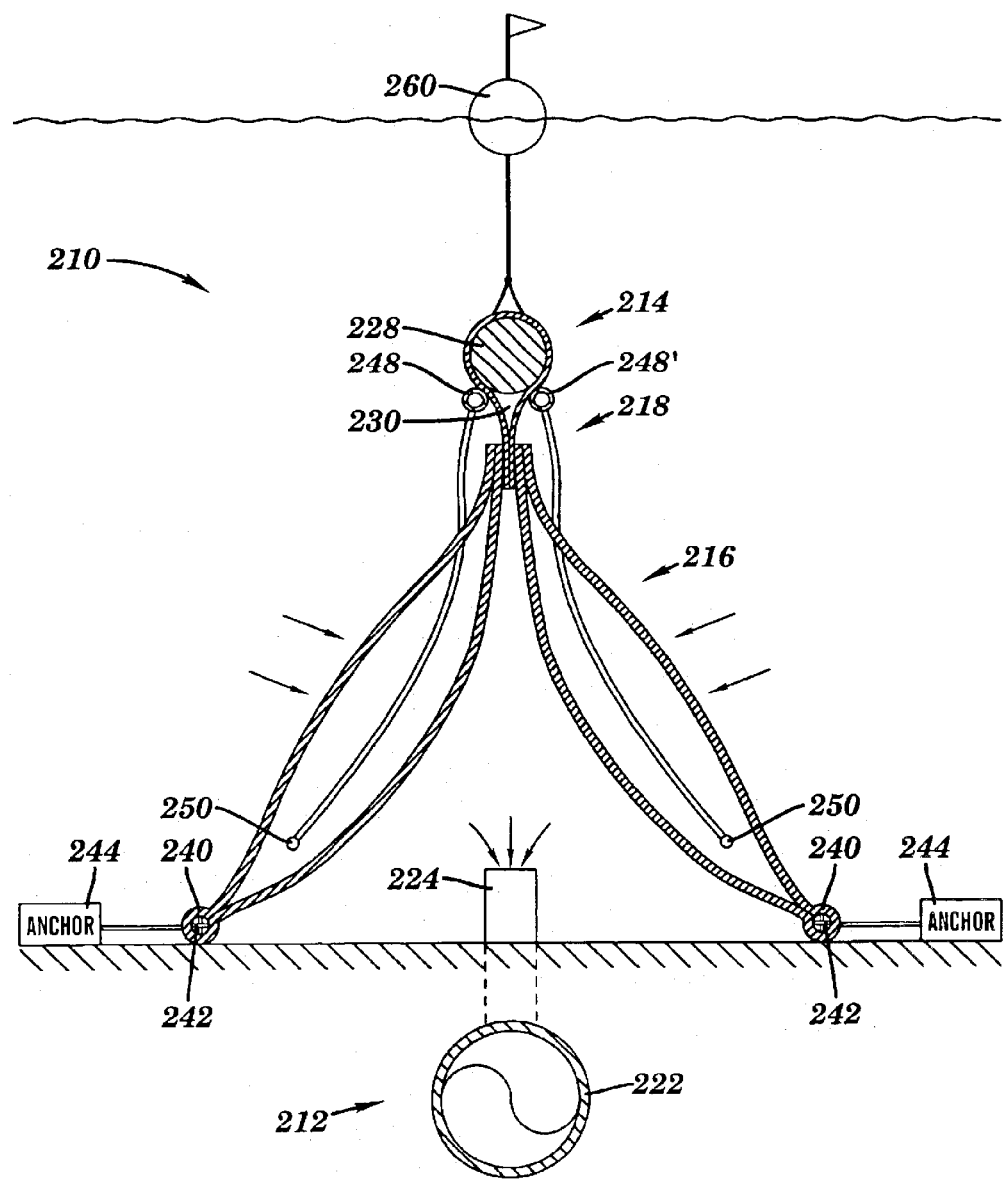
FIG. 5 is a cross sectional view of an third embodiment of the present invention.

Referring now to FIG. 5, a filtration system 210 in accordance with another embodiment of the present invention is disclosed. The filtration system includes a water intake system 212 and a containment/exclusion boom that includes a support system 214, a boom curtain 216, and a gas injection system 218.

The water intake system 212 is substantially the same as water intake system 12 described in connection with the previous embodiments, including a main collector pipe 222 having a plurality of substantially equi-spaced primary intake pipes 224 in communication with an existing water intake system.

The support system 214 of the containment/exclusion boom includes a plurality of flotation units 228 from which the boom curtain is suspended. The flotation units 228 are received within an upper sleeve 230 of the curtain 216. The upper sleeve contains a number of slits formed therein to facilitate insertion (or removal) of the flotation units from the sleeve.

The curtain 216 is actually a double curtain, having left and right sides that are intended to surround the primary intake pipes 224. (The two sides merge together near the terminus of the main collector pipe 222.) Each side of the double curtain is formed of two sheets of geosynthetic material secured together by sewing, heat fusion, etc. and having a plurality of panels formed along its length by having the two sheets connected together substantially from the lower end to the upper end of the curtain. The upper end for each side of the double curtain is secured to the upper sleeve by a permanent connection (e.g., sewing, heat fusion, etc.) or temporary connection such as a zipper connection of the type described above. The lower end of each side of the curtain includes a sleeve 240 that has retained therein a length of ballast chain 242. The lower end also has anchors 244 secured along its length to further assist in maintaining the lower end of the curtain substantially against the floor of the body of water. In the embodiment shown, the anchors and ballast together overcome the buoyant force of the flotation units, effectively maintaining the entire boom submerged.

To allow for cleaning of the curtain 216, the system also includes the gas injection system 218. This system is substantially as described above, including a source of compressed gas such as a pump or compressor, a series of conduits 248, 248' that carry the compressed gas to the curtain, and a plurality of outlets 250 positioned between the sheets of geosynthetic material that form the curtain. Preferably, each panel of the curtain includes one or more outlets.

Because the curtain 216 is anchored in a manner which precludes its upper end from breaching the surface of the water, the boom itself remains hidden from the surface. This allows water traffic to pass without hindrance. To mark the presence of the submerged boom, however, a buoy 260 is tethered to the upper sleeve 230.

For use of all filtration systems, i.e., upon connection to an existing water intake system, water is drawn through the curtain into the region surrounded by the curtain (in the direction of the arrows shown in FIGS. 2, 4, and 5), at which time the water is filtered, and subsequently filtered water is drawn through the plurality of inlets for delivery into the water intake system. From time to time, the gas injection system can be operated to clean impinging materials from the surface of the curtain.

Thus, a further aspect of the present invention relates to a method of filtering water entering a water intake system.

A water delivery system is installed onto an existing water intake system such that it includes a plurality of inlets in a body of water that are in fluid communication with a water intake pump. Thereafter or simultaneously therewith, a containment/exclusion boom of the present invention is installed in a manner such that the boom curtain surrounds substantially all of the plurality of inlets. Following the installation, water can be drawn into the water intake system, whereby water is drawn through the curtain, thereby filtering the water, prior to passing through the plurality of inlets for delivery into the water intake system.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A filtering system for filtering intake water of a water intake system, the filtering system comprising:
   a water intake system comprising a plurality of inlets in fluid communication with a water intake pump; and
   a containment/exclusion boom comprising:
   (i) a support system positioned in a body of water,
   (ii) a curtain connected to the support system and comprising a sheet of flexible fabric material that allows movement of water therethrough;
   wherein the curtain surrounds substantially all of the plurality of inlets and wherein, upon operation of the water intake pump, water is drawn through the curtain at which time the water is filtered, and subsequently filtered water is drawn through the plurality of inlets for delivery into the water intake system.

2. The filtering system according to claim 1 wherein the sheet of flexible fabric material is a geosynthetic fabric.

3. The filtering system according to claim 1 wherein the curtain comprises two sheets of flexible fabric material.

4. The filtering system according to claim 3 further comprising:
   a gas injection system comprising a source of compressed gas in fluid communication with at least one outlet positioned between the two sheets of flexible fabric material.

5. The filtering system according to claim 4 wherein the curtain includes a plurality of panels each defined by the two sheets of flexible fabric being connected together substantially from the lower end to the upper end of the curtain, the plurality of panels being spaced along the length of the curtain.

6. The filtering system according to claim 5 wherein the gas injection comprises a plurality of outlets each in fluid communication with the compressed gas source, with one or more of the plurality of outlets being positioned between the two sheets of flexible fabric for each of the plurality of panels.

7. The filtering system according to claim 1 wherein the support system comprises:
   a plurality of pilings extending upwardly out of the body of water and
   a floating structure connected to the plurality of pilings, the floating structure covering the area of the body of water contained by the curtain.

8. The filtering system according to claim 7 further comprising:
   a collar surrounding each of the plurality of pilings and being vertically adjustable along the length of the piling, with the floating structure being connected to the collar.

9. The filtering system according to claim 7 wherein the plurality of pilings are formed in a single row.

10. The filtering system according to claim 9 wherein the floating structure comprises:
    a pair of floating pipes spaced apart from one another, a plurality of struts spanning between the pair of floating pipes, and a covering material that encloses the region between the pair of floating pipes.

11. The filtering system according to claim 10 wherein the covering material is a non-weight bearing cover.

12. The filtering system according to claim 7 wherein the plurality of pilings are formed in a two substantially parallel rows.

13. The filtering system according to claim 7 wherein the floating structure comprises:
    a first portion of the floating structure connected to one row of the plurality of pilings and
    a second portion of the floating structure connected to another row of the plurality of pilings.

14. The filtering system according to claim 13 wherein the first and second portions of the floating structure are spaced apart, the floating structure further comprises:
    a covering material that encloses the region between the first and second portions of the floating structure.

15. The filtering system according to claim 14 wherein the covering material is a non-weight bearing cover.

16. The filtering system according to claim 13 wherein the first and second portions comprise weight-bearing surfaces.

17. The filtering system according to claim 1, wherein the fluid delivery system comprises:
    an elongate main collector conduit in fluid communication with the water intake pump and
    a plurality of primary intake conduits in communication with the main collector conduit, each of the plurality of primary intake conduits comprising one inlet.

18. The filtering system according to claim 17, wherein the plurality of primary intake conduits are spaced apart along the length of the main collector conduit.

19. The filtering system according to claim 18, wherein the plurality of primary intake conduits are substantially equi-spaced along the length of the main collector conduit.

20. The filtering system according to claim 1 wherein the support system comprises a plurality of flotation units.

21. The filtering system according to claim 20 wherein the upper end of the curtain comprises a sleeve in which is received the plurality of flotation units.

22. The filtering system according to claim 21 wherein the curtain comprises two sides, each side being formed of two sheets of flexible fabric material and including a plurality of panels each defined by the two sheets of flexible fabric being connected together substantially from the lower end to the upper end of the curtain, the plurality of panels being spaced along the length of each side of the curtain.

23. The filtering system according to claim 1 wherein the containment/exclusion boom is submerged.

24. A combination boat dock and water filtering system comprising the water filtering system according to claim 1, wherein the support structure is in the form of a boat dock.

25. The filtering system according to claim 1 wherein the containment/exclusion boom is partially submerged, with the curtain extending substantially the entire depth of the body of water.

26. A method of filtering water entering a water intake system comprising:
    providing a water delivery system comprising a plurality of inlets in a body of water that are in fluid communication with a water intake pump;

installing a containment/exclusion boom into the body of water in a manner surrounding substantially all of the plurality of inlets, the containment/exclusion comprising:

(i) a support system, (ii) a curtain connected to the support system and comprising a sheet of flexible fabric material that allows movement of water therethrough; and drawing water through the water delivery system, whereby water entering the water delivery system is drawn through the curtain, thereby filtering the water, prior to passing through the plurality of inlets for delivery into the water delivery system.

27. The method according to claim 26 wherein the containment/exclusion boom remains submerged after said installing.

28. The method according to claim 26 wherein the containment/exclusion boom remains partially submerged after said installing with the curtain extending substantially the entire depth of the body of water.

* * * * *